United States Patent Office 3,708,276
Patented Jan. 2, 1973

3,708,276
FERTILIZER COATED WITH DISCONTINUOUS LAYER
Horstmar Hecht, Castrop-Rauxel, and Horst Schwandt, Henrichenburg, Germany, assignors to Gewerkschaft Victor Chemische Werke, Castrop-Rauxel, Germany
Continuation-in-part of application Ser. No. 659,573, July 11, 1967. This application June 27, 1969, Ser. No. 837,371
Claims priority, application Germany, July 13, 1966, G 47,415
Int. Cl. C05f *11/00*
U.S. Cl. 71—27                                     7 Claims

ABSTRACT OF THE DISCLOSURE

Granular fertilizer having controlled nutrient release is provided by coating a fertilizer with a pervious, discontinuous layer exposed to the atmosphere. The layer is formed of a water-insoluble synthetic resin and particles foreign to the resin.

RELATED APPLICATION

Figure 1:
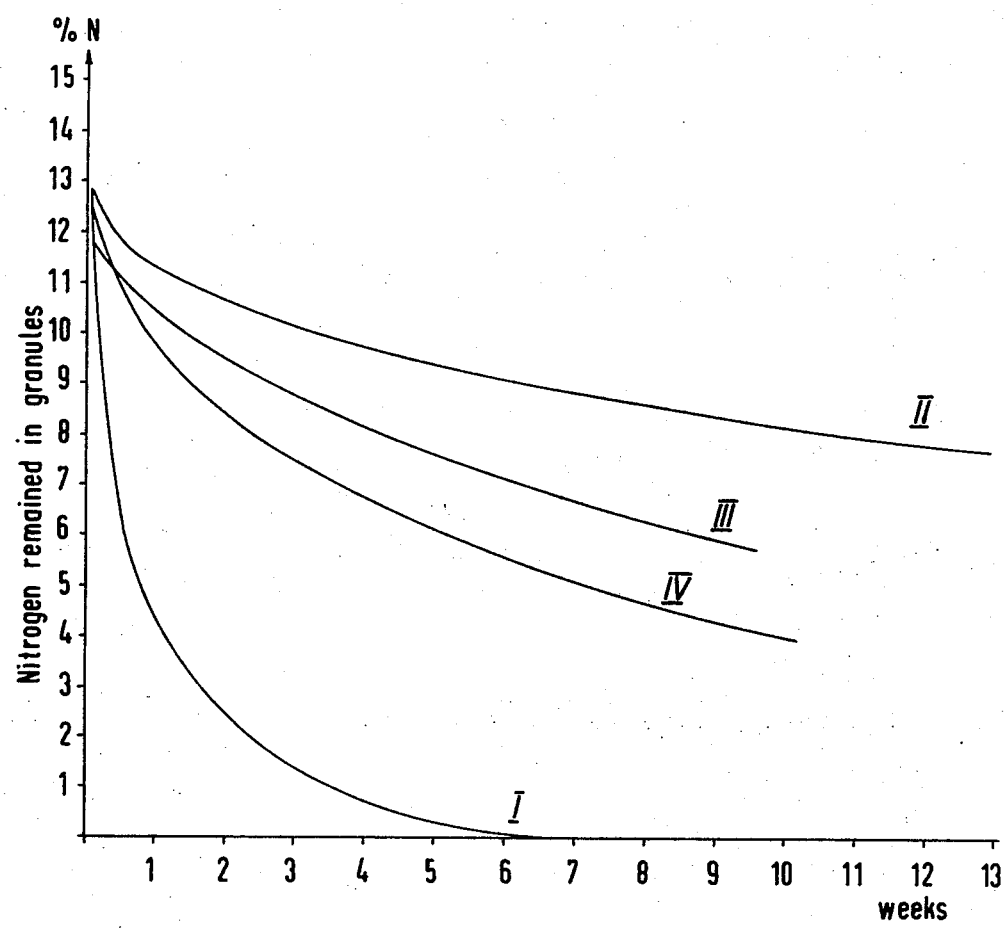

This application is a continuation-in-part of application Ser. No. 659,573, filed July 11, 1967 and now abandoned.

This invention relates to granular fertilizers.

It has been proposed to coat fertilizers with coating layers having different chemical and physical structures, to retard thereby the release of nutrients which, if uncontrolled, can lead to substantial nutrient losses in a humid climate or as a result of sudden or persistent rainfall, thus inducing plants to overconsumption by a temporary excess nutrient release.

Thus, French patent specification 1,270,910 proposes coating mineral fertilizers, in granular or crushed form, with layers of various organic substances, preferably siccative oils. The individual coating layers are deposited with the aid of organic solvents.

According to the Belgian patent specification 600,133, fertilizer granules are treated with a solution of polyoxyalkylenes or polysiloxanes in organic solvents, to prevent caking.

Coating with urea-formaldehyde precondensation products has been disclosed in British patent specification 785,645. Although these coatings prevent the granules caking together, they do not affect the diffusion of nutrients through the plastic film in an aqueous or humid environment.

In order to obtain slow-acting fertilizers, Austrian patent specification 246,187 proposes coating a fertilizer with 2 to 20 percent by weight of a mixture consisting of a polyene-polymer which contains free vinyl groups and a siccative oil having at least two conjugate double bonds and optionally a lipophilic aminoplast-precondensate, whereafter the coatings are hardened in a conventional manner.

Austrian patent specification 246,186 proposes with the same end in view, to coat fertilizers with a solution of a water-soluble, hardenable aminoplast-precondensate admixed with a water-soluble, linear or branched polyester-precondensate derived from polyfunctional carboxylic acids and polyhydric alcohols, with subsequent hardening of the coating agent.

However, the hitherto proposed coating layers have a number of drawbacks. It has been found that products of this kind do not always release the nutrients at a rate which would accord with the requirements of the plants. For example, a proportion of the granules may be inadequately coated, so that their nutrient content is prematurely exhausted, while others again may have an excessively retardant coating which prevents the release of the precalculated amount of nutrient before the termination of the vegetative period of the treated plants. Fertilizer granules having a coating consisting of a water-insoluble synthetic plastic material can be very advantageous where a very slow dissolution rate of the water-soluble fertilizer is desired. On the other hand, the effect of such a coating is, that the introduction of high nutrient concentrations, e.g. for fast growing plants with short vegetative period, cannot be achieved.

German specification No. 1,159,473 proposes granular fertilizers with a continuous layer of a hydrophilic binder for example dextrin, cellulose pitch, or molasses, which contains water-soluble micro-nutrients either within the layer or on its surface. Further, U.S. patent specification 2,806,773 describes a method for controllably releasing micro-nutrients using a grain consisting of an inert, insoluble carrier material coated with a layer which contains the finely distributed trace elements in a non-adhesive, non-hygroscopic binder material. This process relates only to the application of trace elements and does not concern the problem of controlled dissolution of a water-soluble, mineral macro-nutrient.

German patent application P 48,453 describes a process for continuously producing granular fertilizers, in which granulation is carried out with use of organic or inorganic binders and the resulting granules are dusted with finely powdered parting agents. To achieve specific fertilizer effects, other substances, for example trace elements can be added together with the binders. Water-soluble phenol formaldehyde or urea-formaldehyde resins may be used as binders. However, a planned retardation of the dissolution of the fertilizer granules thus produced cannot be achieved by using a water-soluble binder of this kind.

U.S. patent specification 3,223,518 describes a granular fertilizer having a plurality of coatings, the outermost coating of which is an adherent, water insoluble, non-hygroscopic organic resinous encapsulating coating.

U.S. patent specification 3,388,990 describes a method for forming a fertilizer resistant to caking by applying small amounts, 0.001–0.5% by weight, of each of a polymer and a surface active agent to a fertilizer. The product is described as having a "branched configuration" after drying. Thus, such a product should be quite porous, in contrast to one having a closed or substantially closed coating layer.

The invention has for a primary object a granular fertilizer with controlled nutrient release, consisting of a grain with controlled nutrient release, consisting of a grain of an at least partly water-soluble fertilizer and an enveloping layer exposed to the atmosphere and consisting of a water-insoluble synthetic resin applied in an amount of from about 2 to about 20 percent by weight of the finished product.

According to the invention, there is provided a granular fertilizer with controlled nutrient release, comprising a core consisting of an at least partly water-soluble fertilizer and a layer enveloping said core and exposed to the atmosphere, said layer being prepared from a water-insoluble synthetic resin and having incorporated therein particles foreign to said resin, in an amount of from about 1 to about 50 percent by weight based on the total weight of the enveloping layer.

The enveloping layer used according to the invention may comprise conventional synthetic resins previously employed for coating granular fertilizers, for example, copolymers or siccative oils such as linseed oil or soybean oil with cyclopentadiene, optionally modified by indene-addition by means of alkyd resins or other substances such as paraffin waxes melting at 50–95° C. Vinyl-chloride copolymers, especially vinyl-chloride-vinylidene chloride co-polymers and vinyl-chloride-acrylate copolymers are particularly advantageous.

The particles foreign to said resin can be non-homogeneous with said resin, particularly salts, oxides, and metals, and can be homogeneous therewith in the form of organic substances which swell in contact with water.

Non-homogeneous particles include: water-soluble salts such as ammonium sulfate, potassium sulfate and ammonium nitrate (which salts simultaneously provide an additional fertilizer effect); water-insoluble salts such as gypsum ($CaSO_4 \cdot 2H_2O$), particle size 4–6 microns; oxides such as silica, with a particle size of 4–60 microns, in the form of Aerosil, silica gel or diatomaceous earth, as well as colloidal silica obtained by precipitation with acid from a sodium silicate solution, kieselguhr, oxides or manganese, cobalt, molybdenum and iron (III), and silicates; metals such as Ferrum reductum, zinc dust, magnesium dust, copper powder and aluminum powder; alloys of said metals such as brass; molybdenum disulfide; and carbon such as graphite and carbon black.

Organic substances which swell in contact with water include gelatin, alpha-methylcellulose, polyvinyl propionate and butadiene-acrylonitrile copolymers.

As indicated above, the foreign particles are present in the resin layer in amounts ranging from about 1 to about 50 percent by weight of the resin. Thus, when rapid release of fertilizer is desired, larger quantities such as about 50 percent of foreign particles are included with the resin. Similarly, when release of fertilizer is to be relatively slow, smaller quantities, as small as about 1 percent, of the foreign particles are used. Preferred amounts are; salts, 1–5 percent; oxides, 3–12 percent; metals, 3–20 percent; organic substances 5–10 percent.

It is also preferred that the foreign particles have an average particle size of from about 4 to about 60 microns.

A particularly advantageous combination of enveloping layer and incorporated material is constituted by a sheath formed of a copolymer of vinyl chloride and acrylic esters, such as methyl acrylate, into which particles of zinc dust and copper dust have been incorporated. This combination confers a particularly advantageous dissolution characteristic to the water-soluble fertilizer granule, while at the same time the incorporated metal ensures a steady supply of copper to the soil.

By means of the substances added to the enveloping layer, the rate of nutrient release of the fertilizer granule can be controlled in a desired manner as will now be described by way of example with reference to the accompanying drawings in which both figures show graphs indicating the rate of nutrient release.

In FIG. 1, the Curve I represents extremely rapid elutriation and Curve II an extremely slow elutriation of the nutrients from the granules stored under water at room temperature. Curve III represents the elutriation rate of granules whose enveloping layer, consisting of a vinyl chloride-methyl acrylate copolymer, contains 6 percent by weight of metallic zinc. The accelerating effect of this addition in relation to Curve II is clearly recognizable, without however, leading to an extremely fast primary nutrient release as in the case of Curve I. Curve IV illustrates the elutriation rate of granules comprising 3 percent by weight of metallic magnesium in the same enveloping layer. The elutriation proceeds faster than in the case of zinc addition.

Figure 2:
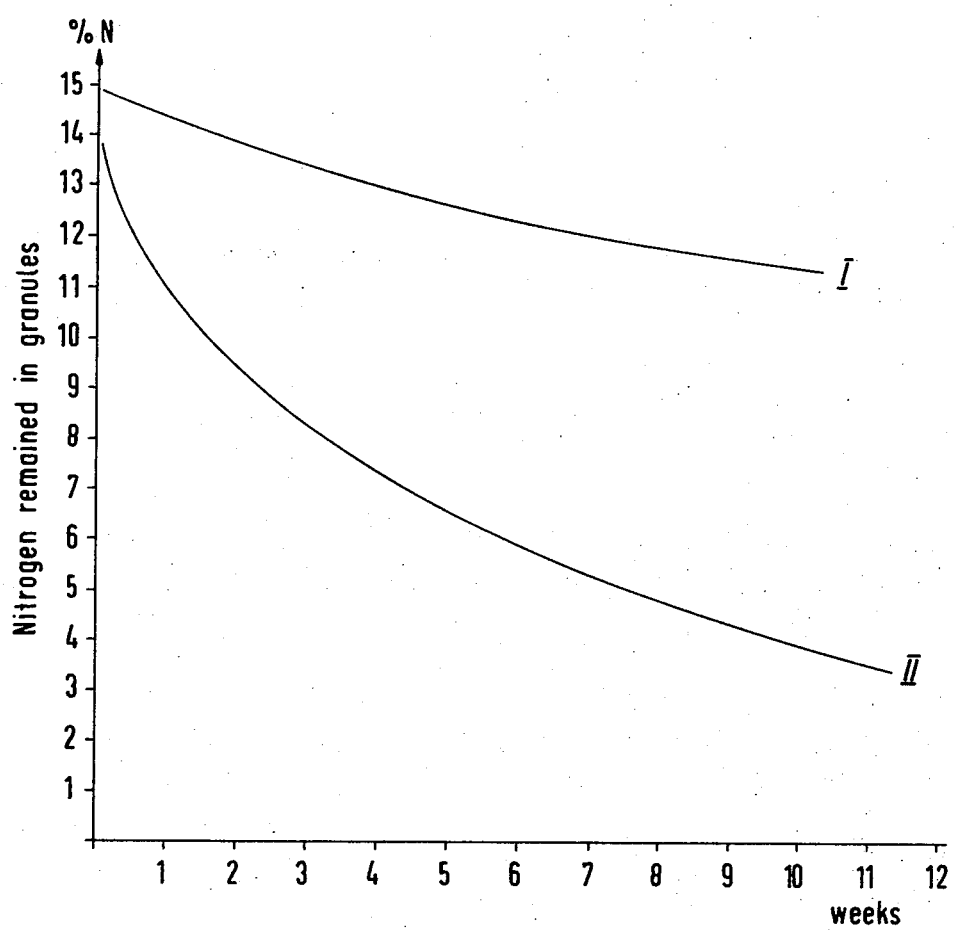

Whereas FIG. 1 illustrates the influence of the nature of the substances added on the rate of nutrient release, FIG. 2 demonstrates the influence of the quantity of the additive. The enveloping layer is again made up of a vinyl chloride-methyl acrylate copolymer. Curve I represents the elutriation of granules containing 10 percent of iron, in the form of Ferrum reductum, in the enveloping layer, whilst Curve II illustrates the elutriation of the same granules, but with addition of 20 percent of iron, under the same experimental conditions. As shown, the increase of the quantity of metal added results in an increased but nevertheless uniform rate of elutriation.

The preparation of the fertilizers according to the invention can be carried out by various conventional processes. It is advantageous to suspend or to dissolve the substances to be incorporated into the enveloping layer in a solution or emulsion of the sheathing material and to spray the solution or emulsion thus obtained on the granular fertilizer. It is also possible to prepare separately a solution or emulsion of the sheath material and of the additive substances and to spray the two solutions on the granular material with a mixer nozzle.

In forming the enveloping layers on the fertilizer cores, it is particularly advantageous to use aqueous resin emulsions or dispersions. Thus, water can be evaporated readily and there is no need to include a solvent recovery system, as is necessary for economical operation with resins used with organic solvents (e.g. alcohols, xylenes).

The following examples further illustrate the invention.

EXAMPLE 1

20 kg. of a pre-warmed, well granulated fertilizer were sprayed with an aqueous emulsion of a polyvinyl chloride-polyvinylidene chloride copolymer, while finely divided metallic zinc (zinc dust) was added at uniform rate through a mixing nozzle, in such a manner that altogether about 100 g. of Zn were distributed on the surface of the granules, within the enveloping plastic layer. The elutriation characteristics of the granules thus treated were found to be superior with regard to nutrient release to those prepared without addition of metal particles.

EXAMPLE 2

20 kg. of a pre-warmed granular fertilizer were sprayed with an emulsion of a vinyl chloride-acrylic ester copolymer having a solids content of 50 percent. Prior to spraying, ammonium sulphate was added to the emulsion in such amounts that the spraying liquid contained two percent of this salt. The resulting enveloping layer contains approximately 4 percent by weight of ammonium sulfate. The granules thus prepared displayed a nutrient release rate which favorably differed from that of granules coated with the plastic alone.

EXAMPLE 3

20 kg. of complete fertilizer granulate are sprayed with a dispersion of a vinylidene-chlorideacrylic ester copolymer with a solids content of about 55 percent, after stirring 25 g. kieselguhr into the dispersion. This dispersion is so sprayed on the granulate, which has first been heated to 60 to 120° C. and agitated, that the charging rate is slow at first, with increasing thickness of the coating layer, the charging rate is increased. After 40–50 minutes, the coating process is completed. The granulates thus produced show a nutrient delivery rate which is superior to that without the incorporation of kieselguhr in the coating layer, as far as the regulated supply of the nutrients is concerned.

EXAMPLE 4

20 kg. complete fertilizer granulate are sprayed with a dispersion of a vinylidene-chlorideacrylic ester copolymer with a solids content of about 55 percent, after 100 g. of iron powder (ferrum reductum) have been fed through the nozzle air of a two-component nozzle to the spray jet and mixed with it. This dispersion is filtered and so sprayed on the granulate, which has first been preheated and agitated. The charging rate is at first relatively slow; with increasing thickness of the coating layer, the charging rate is increased. After 40–50 minutes, the coating process is completed. The granulates thus produced show a nutrient delivery rate which is superior to that without incorporation of iron powder in the coating layer, as far as the regulated supply of the nutrients is concerned.

EXAMPLE 5

20 kg. of complete fertilizer granulate are sprayed with a dispersion of a vinylidene-chlorideacrylic ester copolymer with a solids content of about 55 percent, after 100 g. of aluminum powder have been stirred into the dispersion. This dispersion is preheated, agitated, and sprayed as in Example 3. The granulates thus produced show a nutrient delivery rate which is superior to that without incorporation of aluminum powder in the coating layer, as far as the regulated supply of nutrients is concerned.

EXAMPLE 6

20 kg. of complete fertilizer granulate are sprayed with a dispersion of a vinylidene-chlorideacrylic ester copolymer with a solids content of about 55 percent, after 50 g. of copper powder and 75 g. of zinc powder have been fed as a mixture through the nozzle air of a two-component nozzle to the spray jet and mixed with it. This dispersion is preheated, agitated, and sprayed as in Example 3. The granulates thus produced show a nutrient delivery rate which is superior to that without incorporation of copper and zinc powder in the coating layer, as far as the regulated supply of nutrients is concerned.

EXAMPLE 7

20 kg. of complete fertilizer granulate are sprayed with a dispersion of a vinylidene-chlorideacrylic ester copolymer with a solids content of about 55 percent, after 50 g. of magnesium powder have been fed through the nozzle air of a two-component nozzle to the spray jet and mixed with it. This dispersion is preheated, agitated, and sprayed as in Example 3. The granulates thus produced show a nutrient-delivery rate which is superior to that without incorporation of magnesium powder in the coating layer, as far as the supply regulated of nutrients is concerned.

EXAMPLE 8

20 kg. of complete fertilizer granulate are sprayed with a dispersion of a vinylidene-chlorideacrylic ester copolymer with a solids content of about 55 percent, after 50 g. of graphite (finely divided or colloidal) have been stirred into the dispersion. This dispersion is preheated, agitated, and sprayed as in Example 3. The granulates thus produced show a nutrient delivery rate which is superior to that without incorporation of graphite in the coating layer, as far as the regulated supply of nutrients is concerned.

EXAMPLE 9

20 kg. of complete fertilizer granulate are sprayed with a dispersion of a vinylidene-chlorideacrylic ester copolymer with a solids content of about 55 percent, after 50 g. of carbon black have been stirred into the dispersion. This dispersion is preheated, agitated, and sprayed as in Example 3. The granulates thus obtained show a nutrient delivery rate which is superior to that without the incorporation of carbon black in the coating layer, as far as the regulated supply of nutrients is concerned.

EXAMPLE 10

20 kg. of complete fertilizer granulate are sprayed with a dispersion of a vinylidene-chlorideacrylic ester copolymer with a solids content of about 55 percent, after 25 g. of micaceous iron ore (hematite, $Fe_2O_3$) have been stirred into the dispersion. This dispersion is preheated, agitated and sprayed as in Example 3. The granulates thus obtained show a nutrient-delivery rate which is superior to that without the incorporation of hematite, as far as the regulated supply of nutrients is concerned.

EXAMPLE 11

20 kg. of complete fertilizer granulate are sprayed with a dispersion of a vinylidene-chlorideacrylic ester copolymer with a solids content of about 55 percent, after 40 g. of gypsum ($CaSO_4 \cdot 2H_2O$) have been stirred into the dispersion. This dispersion is preheated, agitated, and sprayed as in Example 3. The granulates thus obtained show a nutrient-delivery rate which is superior to that without the incorporation of gypsum, in the coating layer, as far as the regulated supply of nutrients is concerned.

EXAMPLE 12

20 kg. of complete fertilizer granulate are sprayed with a dispersion of a vinylidene-chlorideacrylic ester copolymer with a solids content of about 55 percent, after 2.5–15 g. of methyl cellulose have been stirred into the dispersion. This dispersion is preheated, agitated, and sprayed as in Example 3. The granulates thus obtained show a nutrient-delivery rate which is superior to that without incorporation of the methyl cellulose in the coating layer, as far as the regulated supply of nutrients is concerned.

EXAMPLE 13

20 kg. of complete fertilizer granulate are sprayed with a dispersion of a vinylidene-chlorideacrylic ester copolymer with a solids content of about 55 percent, after 5–20 g. of gelatin have been stirred into the dispersion. This dispersion is preheated, agitated and sprayed as in Example 3. The granulates thus obtained show a nutrient-delivery rate which is superior to that without the incorporation of gelatin in the coating layer as far as the regulated supply of nutrients is concerned.

EXAMPLE 14

20 kg. of complete fertilizer granulate are sprayed with a dispersion of a vinylidene-chlorideacrylic ester copolymer with a solids content of about 55 percent, after 80 g. of polyvinyl propionate in the form of a 50 percent aqueous dispersion have been stirred into the above-mentioned dispersion. This dispersion is preheated, agitated and sprayed as in Example 3. The granulates thus obtained show a nutrient-delivery rate which is superior to that without the incorporation of polyvinyl propionate in the coating layer, as far as the regulated supply of nutrients is concerned.

EXAMPLE 15

20 kg. of complete fertilizer granulate are sprayed with a dispersion of a vinylidene-chlorideacrylic ester copolymer with a solids content of about 55 percent, after 90 g. of butadiene-acrylic nitrile copolymer dispersion are stirred into the above-mentioned dispersion. This dispersion is preheated, agitated and sprayed as in Example 3. The granulates thus obtained show a nutrient-delivery rate which is superior to that without the incorporation of butadiene-acrylic nitrile copolymer in the coating layer, as far as the regulated supply of nutrients is concerned.

The percentage of foreign particles present in the enveloping layers formed in each of the foregoing examples is shown in Table I, below.

TABLE I

| Example Number: | Foreign particles | Percent weight of enveloping layer |
|---|---|---|
| 1 | Zn | 12 |
| 2 | $(NH_4)_2SO_4$ | 4 |
| 3 | Kieselguhr | 3.5 |
| 4 | Fe | 12 |
| 5 | Al | 12 |
| 6 | Cu, Zn | 14.7 |
| 7 | Mg | 6.5 |
| 8 | C (graphite) | 6.5 |
| 9 | C | 6.5 |
| 10 | Fe ore | 3.5 |
| 11 | $CaSO_4 \cdot 2H_2O$ | 5.2 |
| 12 | α-Methylcellulose | 1.4 |
| 13 | Gelatin | 1.4 |
| 14 | Polyvinylpropionate | 5.2 |
| 15 | Butadiene-acrylonitrile copolymer | 5.2 |

The complete fertilizer granulate referred to in the examples including those shown in FIG. 1 is a composition containing (percent by weight): 15 N, 15 $P_2O_5$ and 15 K₂O. Other typical granulates suitable herein include the following, with weight percent being indicated:

| N | P₂O₅ | K₂O | MgO |
|---|------|-----|-----|
| 14 | 7 | 14 | 4 |
| 12 | 12 | 17 | 2 |
| 12 | 12 | 20 | |
| 22 | 6 | 6 | |

Ammonium sulfate and mixtures thereof with ammonium nitrate, can also be used.

With respect to the critical proportions of components herein, it has been found that less than about 2 percent by weight of synthetic resin does not provide a layer completely enveloping the granules. As a consequence, insufficient control of nutrient release results. With more than about 20 percent by weight of synthetic resin, nutrient release is excessively slow and uneconomical. Correspondingly, less than about 1 percent by weight of particles associated with the synthetic resin is insufficient to provide satisfactory permeability of the enveloping layer, and nutrient release is excessively slow. With more than about 50 percent by weight of the particles in association with the synthetic resin, the resulting enveloping layer is excessively permeable and nutrient release is too rapid.

We claim:

1. A granular fertilizer having controlled nutrient release, comprising granules of an at least partially water-soluble fertilizer and on the surface thereof a pervious layer of a water-insoluble synthetic resin having incorporated therein, in an amount from about 1 to 50 percent by weight of said resin, particles of an organic substance which swells in contact with water and is selected from the group consisting of gelatin and alpha-methylcellulose polyvinyl propionate and butadiene arcrylonitrile copolymer, said layer substantially enveloping said granules of fertilizer and being exposed to the atmosphere.

2. The granular fertilizer of claim 1 wherein the organic substance is gelatin.

3. The granular fertilizer of claim 1 wherein the organic substance is alpha-methylcellulose.

4. The granular fertilizer of claim 1 wherein the water-insoluble synthetic resin is selected from the group consisting of a vinyl chloride copolymer, a vinyl chloride-vinylidene chloride copolymer, a vinyl chloride-acrylic ester copolymer and a vinylidene chloride-acrylic acid ester copolymer.

5. The granular fertilizer of claim 1 wherein the pervious enveloping layer of the synthetic resin is in an amount of from about 2 to 20 percent by weight of said fertilizer.

6. The granular fertilizer of claim 1 wherein the organic substance is polyvinyl propionate.

7. The granular fertilizer of claim 1 wherein the organic substance is butadiene-acrylonitrile copolymer.

References Cited

UNITED STATES PATENTS

| | | | |
|---|---|---|---|
| 2,936,226 | 5/1960 | Kaufman | 71—64 |
| 3,192,031 | 6/1965 | Zaayenga | 71—64 |
| 3,207,592 | 9/1965 | Harper et al. | 71—11 |
| 3,223,518 | 12/1965 | Hansen | 71—64 |
| 3,232,740 | 2/1966 | Sor et al. | 71—64 |
| 3,388,990 | 6/1968 | Maruta et al. | 71—64 |
| 3,276,857 | 10/1966 | Stransbury et al. | 71—64 |

CHARLES N. HART, Primary Examiner

U.S. Cl. X.R.

71—31, 63, 64 F